United States Patent [19]

Miyajima et al.

[11] Patent Number: 4,629,748
[45] Date of Patent: Dec. 16, 1986

[54] ERASABLE BALL-POINT PEN INK

[75] Inventors: Tamotsu Miyajima; Noriatsu Tanaka, both of Kanagawa; Nobuto Saito, Gunma, all of Japan

[73] Assignee: Pilot Man-Nen-Hitsu Kabushiki Kaisha, Tokyo, Japan

[21] Appl. No.: 738,807

[22] Filed: May 29, 1985

[51] Int. Cl.$^4$ .................. C09D 5/00; C09D 11/00
[52] U.S. Cl. ...................... 523/161; 106/20; 106/30; 106/31
[58] Field of Search ............... 106/20, 30, 31; 523/161

[56] References Cited

U.S. PATENT DOCUMENTS

| | | | |
|---|---|---|---|
| 3,844,994 | 10/1974 | Vijayendran | 524/245 |
| 4,097,290 | 6/1978 | Muller et al. | 106/29 |
| 4,329,262 | 5/1982 | Muller | 106/30 |
| 4,349,639 | 9/1982 | Muller | 106/30 |
| 4,389,499 | 6/1983 | Riesgraf | 524/525 |
| 4,390,646 | 6/1983 | Ferguson | 523/161 |
| 4,391,927 | 7/1983 | Farmer | 524/505 |
| 4,393,103 | 7/1983 | Louden | 427/391 |

FOREIGN PATENT DOCUMENTS 2094820  9/1982  United Kingdom ............... 523/161

*Primary Examiner*—Theodore Morris
*Attorney, Agent, or Firm*—Sughrue, Mion, Zinn, Macpeak, and Seas

[57] ABSTRACT

An erasable ball-point pen ink is described comprising a rubber component, a volatile solvent, a pigment and a nonvolatile solvent, said ink further containing at least one dispersant that is liquid at room temperature and completely soluble in said volatile solvent and which is selected from the group consisting of alkyl phosphate esters, amines and oxyethyleneoxypropylene block copolymers, by which a ball-point pen is available that ensures a very smooth ink flow and letter writing during any season of the year without blocking of the small clearance between the writing ball and the ball holder even when the writing tip is uncapped and exposed to the atmosphere for a prolonged period. The ink is particularly adapted to be used with ball-point pens for writing fine letters.

19 Claims, No Drawings

ERASABLE BALL-POINT PEN INK

BACKGROUND OF THE INVENTION

1. Field of the Invention

The present invention relates to an erasable ball-point pen ink. More specifically, the invention relates to an ink that is particularly adapted to be used with ball-point pens for writing fine letters which leaves ink traces that remain erasable with a rubber eraser for a certain period of time after writing.

2. Description of the Prior Art

Prior art techniques concerning inks of the type contemplated by the present invention are disclosed in Japanese Unexamined Published Patent Application Nos. 156731/79, 155266/81, 170967/82 and 170968/82.

The inks proposed in these patent applications have two things in common. First, in order to maintain the erasability of ink traces, pigments, not dyes, are used as ink colorants, and they are combined with rubbers to provide ink suspensions having very high viscosities (1 to $6 \times 10^6$ cps). Second, the rubbers are dissolved in volatile solvents, which, after writing, rapidly evaporate from the ink, thus increasing the viscosity of the ink traces and preventing penetration of the ink into the paper. As a natural consequence of this mechanism of ink erasability, the small clearance defined by the writing ball and the ball holder has a tendency to be clogged by agglomerates in the ink while the ink is passing through the clearance during writing. If the writing tip is left uncapped for several months, the high viscosity of the ink, coupled with the evaporation of the volatile solvent that occurs at the writing tip, upsets the stability of the pigment suspension and increases the chance of formation of agglomerates in the ink. Additionally, the inks disclosed in the above listed prior art references ensure smooth ink flow from the writing tip by using a lubricant selected from higher aliphatic acids such as stearic acid, palmitic acid, oleic acid and lauric acid. However, these higher aliphatic acids greatly increase the chance of ink clogging at the writing tip if the tip is left uncapped in a humid atmosphere. A probable reason for this phenomenon is as follows: the carboxyl group in an aliphatic acid exhibits such strong hydrophilicity that water is adsorbed onto the writing tip to upset the uniformity of the composition of the oily ink suspension, and the resulting agglomerates in the suspension, coupled with the increase in viscosity due to the evaporation of the volatile solvent, cause plugging of the writing tip.

With ball-point pens intended for writing thick letters with a ball diameter of 1.0 mm, clogging of the writing tip seldom occurs, but this is not the case for fine letter writing ball-point pens with a ball diameter of 0.7 to 0.8 mm (see Comparative Examples 1 to 3 later presented). Presently, no fine letter writing ball-point pen is available that ensures a very smooth ink flow and letter writing during any season of the year without blocking of the small clearance between the writing ball and the ball holder even when the writing tip is left uncapped and exposed to the atmosphere for a prolonged period.

SUMMARY OF THE INVENTION

As a result of research to solve the above problem, the present inventors found that an ink dispersion preferred for use as a ball-point pen ink cannot be obtained by simply blending a rubber component, a volatile solvent, a pigment and a nonvolatile solvent, rather, they discovered that in order to maintain a satisfactory ink dispersion over an extended period, certain other additives must be present. Although inks must have lubricity, one can understand from the foregoing description that the additives incorporated must be more dispersible in the ink that higher aliphatic acids and should render the ink less sensitive to moisture. However, these are not the only requirements that should be met by the ideal ink and rust prevention at the writing tip is also necessary.

On the basis of the above observations, the present inventors continued their research on the development of an ideal ball-point pen ink and found that an additive that exhibits lubricating and rust-preventing effects, retains good ink dispersion and which provides the ink with less susceptibility to moisture even in a humid environment is a dispersant that is liquid at room temperature and which is completely soluble in the volatile solvent used to dissolve the rubber component in the ink. Such a dispersant is selected from alkyl phosphate esters, amines and oxyethylene-oxypropylene block copolymers. The present invention was reached on the basis of this finding.

DETAILED DESCRIPTION OF THE INVENTION

The certain period of time for which the ink traces can be erased with the rubber eraser is within about 3 hours.

Illustrative liquid alkyl phosphate esters used as a dispersant in the present invention include nonyl phosphate, lauryl phosphate, oleyl phosphate, polyoxyethylenenonylphenol phosphate, polyoxyethylenelauryl phosphate, polyoxyethylenecetyl phosphate and polyoxyethyleneoleyl phosphate esters. These alkyl phosphate esters may be used either singly or in combination.

Illustrative liquid amines tht may also be used as a dispersant are organic amines which include primary, secondary and tertiary aliphatic or aromatic mono-, di- and triamines. Specific examples include dimethylalkylamines, oxyethylenealkylamines, polyoxyethyleneamines, and diamines of various acids of oil and fat. These amines may be used either singly or in combination.

Suitable liquid oxyethylene-oxypropylene block copolymers that may be used as the dispersant have molecular weights not higher than 4,500 and contain 70% by weight or less of oxyethylene based on the weight of oxyethylene-oxypropylene block copolymer. These oxyethylene-oxypropylene block copolymers may be used either singly or in combination. These oxyethylene-oxypropylene block copolymers may optionally be used in combination with the alkyl phosphate esters mentioned above.

The dispersant is used in an amount ranging from about 0.2% to about 6% of the total weight of the ink. If the amount of the dispersant exceeds 6% of the ink weight, the ink penetrates so much into the paper that the subsequent erasability of the ink is impaired. If, on the other hand, less than 0.2% of the ink weight of the dispersant is used, no satisfactory ink dispersion is obtainable.

Preferred rubber components are synthetic rubbers of cis-1,4-polyisoprene series, more preferably those having a Mooney viscosity of 20 to 26. The content of the rubber component can be from about 10% to about 28% of the total weight of the ink. If it is less than about 10%, poor erasability may result. If the content is more than about 28%, there may be obtained an ink having an undesirably high viscosity and, hence, poor flowability. In addition, the self-cohesive force of the ink may become so high that the ink could hardly be transferred from the surface of a writing ball onto the surface of paper.

In the present invention, a volatile solvent is used to dissolve the rubber component. The solvent may be any low boiling or medium boiling solvent having a boiling point of 60° to 170° C. Examples of useful solvents include aliphatic hydrocarbons, such as n-hexane, isohexane, n-heptane, n-octane isooctane and n-decane; petroleum solvents, such as solvent naphtha, heavy naphtha, kerosene and ligroin; aromatic hydrocarbons, such as benzene, toluene and xylene; and mixtures of these solvents. Preferred examples of useful solvents include a mixture of aliphatic hydrocarbons. The content of the solvent can be from about 20% to about 40% of the total weight of the ink. If the solvent is used in an amount less than about 20%, homogeneous inks would not be obtained because of insufficient dissolving of the rubber component. Ball-point pens using such inks will produce uneven ink traces, or may be clogged around the writing ball and become totally useless. If the solvent is used in an amount more than about 40%, the resulting inks will have deteriorated erasabilities since they remain fluidable on the surface of paper for undesirably long periods of time and penetrate into the fibers of the paper.

Examples of pigments useful in the present invention include inorganic pigments, such as carbon black, graphite, Prussian blue and iron oxide; and organic pigments of, e.g., the azo, anthraquinone, phthalocyanine, triphenylmethane, quinacridone and dioxazine series. It is preferable to use pigments having a particle size of 0.002 micron to 5 microns. The content of the pigment can be from about 12% to about 35% of the total weight of the ink. If it is less than about 12%, the inks obtained will form ink traces having an insufficient density. If it is more than about 35%, inks having an undesirably high viscosity and, hence, poor flowability, will be obtained.

The nonvolatile solvent used to dissolve the pigment in the ink of the present invention may have a boiling point of about 300° C. or above. Examples of useful solvents include petroleum lubricating oils; plasticizers, such as dioctyl phthalate (DOP), dioctyl adipate (DOA) and dibutyl phthalate (DBP). Preferred examples of useful solvents include dioctyl adipate. The content of the nonvolatile solvent can be from about 17% to about 38% of the total weight of the ink. If the content is less than about 17%, there may result insufficient mixing between a rubber solution (or a solution of a rubber component in a volatile solvent) and a pigment paste (or a milled product of a pigment and a nonvolatile solvent) during ink preparation. In such cases, homogeneous inks could not be obtained. If the content of the nonvolatile solvent is more than about 38%, ink traces having poor erasabilities will be formed.

The erasable ball-point pen ink in accordance with the present invention may, as desired or necessary, contain finely divided particles of an inorganic compound that is inactive to (i.e., does not chemically combine with) other ink components and has a particle size of 0.002 micron to 1.5 microns, as well as a semi-solid substance or a soft-solid substance having a melting point not higher than 130° C. The inorganic compound in fine particulate form is incorporated and exhibits the following two functions: (1) the elasticity of the rubber component is reduced and, hence, the ink flows smoothly through the small clearance between the writing ball and the ball holder without causing any increase in the wear of the ball holder; and (2) the spinnability of the ink is reduced. Specific examples of the fine particulate inorganic compound are calcium carbonate and silicon oxide. The semi-solid substance and the soft-solid substance having a melting point higher than room temperature and not higher than 130° C. are used in order to improve the attachment of ink to the surface of the writing ball and to ensure smooth ink transfer onto paper without reducing ink viscosity. As a result, satisfactory ink traces can be formed without impairing their erasability. The semi-solid substance is one which is not so soft as to show a flowability at room temperature, but which shows a plastic deformation at room temperature. The soft-solid substance is one which does not show a plastic deformation even when a small amount of stress is applied at room temperature, but which melts even when heating at temperature not higher than 130° C. is applied for a short period of time. A suitable example of such semi-solid or soft-solid substance is petroleum waxes, such as paraffin and ceresine waxes; vegetable waxes, such as carnauba wax, haze tallow and rice wax; animal waxes, such as bees wax and shellac wax; lanolins, such as wool wax; vaselines, such as petrolatum; silicone oils; and the like.

The present invention will now be further illustrated by the following Examples.

EXAMPLE 1

| Components | % by weight |
|---|---|
| Rubber component:<br>IR 2200<br>(cis-1,4-polyisoprene (Mooney viscosity: 20, weight average molecular weight: 600,000–700,000), product of Japan Synthetic Rubber Co., Ltd.) | 17.0 |
| Volatile solvent:<br>Idemitsu IP Solvent 1016<br>((B.P.: 70–155° C.), i.e., a mixture of aliphatic hydrocarbons, product of Idemitsu Petrochemical Co., Ltd.) | 27.5 |
| Pigment:<br>Carbon Black MA-100<br>((average particle size: 22 microns), product of Mitsubishi Chemical Industries Co., Ltd.) | 19.0 |
| Nonvolatile solvent:<br>Dioctyl adipate<br>(product of Daihachi Kagaku Co., Ltd.) | 32.5 |
| Dispersant:<br>Nikkol TLP-4<br>(trade name of Nikko Chemicals K.K. for tripolyoxyethylene(10)laurylether phosphate ester) | 4.0 |

The rubber component was masticated with a two-roll mill to a Mooney viscosity of 22. To the resulting rubber component was added the volatile solvent, and the resulting mixture was heated in a sealed vessel for 48 hours at 70° C. to yield a rubber solution.

A pigment paste was prepared by kneading the pigment, the nonvolatile solvent, and the dispersant for a period of 3 hours using a three-roll mill.

The rubber solution and the pigment paste were then kneaded with a kneader for 5 hours at 60° to 70° C. to give a black homogeneous ink.

EXAMPLE 2

| Components | % by weight |
|---|---|
| Rubber component:<br>IR 2200 | 19.0 |
| Volatile solvent:<br>Idemitsu IP Solvent 1016 | 28.0 |
| Pigments: | |
| Cyanine Blue 4920<br>(i.e., copper phthalocyanine, product of<br>Dainichiseika Color & Chemicals Mfg.<br>Co., Ltd.) | 12.0 |
| Alkali Blue Powder RP-00<br>(product of Orient Chemical Co., Ltd.) | 12.0 |
| Nonvolatile solvent:<br>Dioctyl adipate | 23.5 |
| Dispersant:<br>Plysurf A 208 B<br>(trade name of Dai-Ichi Kogyo Seiyaku<br>Co., Ltd. for polyoxyethylenenonylphenol<br>phosphate ester) | 5.5 |
| A blue ink was prepared as in Example 1. | |

EXAMPLE 3

| Components | % by weight |
|---|---|
| Rubber component:<br>IR 2200 | 21.0 |
| Volatile solvent:<br>Idemitsu IP Solvent 1016 | 33.5 |
| Pigment:<br>Carbon Black MA-100 | 16.0 |
| Nonvolatile solvent:<br>Dioctyl adipate | 25.0 |
| Dispersant:<br>Farmin DM-20<br>(trade name of Kao Soap Co., Ltd., for<br>dimethyllaurylamine) | 4.5 |
| A black ink was prepared as in Example 1. | |

EXAMPLE 4

| Components | % by weight |
|---|---|
| Rubber component:<br>IR 2200 | 19.5 |
| Volatile solvent:<br>Idemitsu IP Solvent 1016 | 27.0 |
| Pigments: | |
| Cyanine Blue 4920 | 11.0 |
| Alkali Blue Powder RP-00 | 11.0 |
| Nonvolatile solvent:<br>Dioctyl adipate | 26.5 |
| Dispersant:<br>Emulgen P.P 230<br>(trade name of Kao Soap Co., Ltd. for<br>oxyethylene-oxypropylene block copolymer) | 5.0 |
| A blue ink was prepared as in Example 1. | |

EXAMPLE 5

| Components | % by weight |
|---|---|
| Rubber component:<br>IR 2200 | 17.5 |
| Volatile solvent:<br>Idemitsu IP Solvent 1016 | 31.0 |
| Pigments: | |
| Brilliant Carmine 1480 | 9.0 |

| Components | % by weight |
|---|---|
| (product of Dainichiseika Color &<br>Chemicals Mfg. Co., Ltd.) | |
| Lake Red C<br>(product of Dainichiseika Color &<br>Chemicals Mfg. Co., Ltd.) | 17.5 |
| Nonvolatile solvent:<br>Dioctyl adipate | 22.0 |
| Dispersant:<br>Nymin L 201<br>(trade name of Nippon Oils & Fats Co.,<br>Ltd. for oxyethylenedecylamine) | 3.0 |
| A red ink was prepared as in Example 1. | |

EXAMPLE 16

| Components | % by weight |
|---|---|
| Rubber component:<br>IR 2200 | 20.5 |
| Volatile solvent: 34.0<br>Idemitsu IP Solvent 1016 | |
| Pigments: | |
| Carbon Black MA-100 | 13.5 |
| 718 Fast Blue Conc. SF<br>(i.e., Victoria Blue Lake, product of<br>Dainichiseika Color & Chemicals Mfg.<br>Co., Ltd.) | 3.0 |
| Nonvolatile solvent:<br>Dioctyl adipate | 27.0 |
| Dispersant:<br>Duomen TDO<br>(trade name of Lion Akzo Co., Ltd. for<br>tallow trimethylenediamine dioleate) | 2.0 |
| A black ink was prepared as in Example 1. | |

EXAMPLE 7

| Components | % by weight |
|---|---|
| Rubber component:<br>IR 2200 | 17.5 |
| Volatile solvent:<br>Idemitsu IP Solvent 1016 | 28.0 |
| Pigments: | |
| Carbon Black MA-100 | 15.0 |
| Cyanine Blue 4920 | 5.0 |
| Nonvolatile solvent:<br>Dioctyl adipate | 31.5 |
| Dispersants: | |
| Plysurf A 208 B | 2.0 |
| Emulgen P.P 230<br>(i.e., oxyethylene-oxypropylene block<br>copolymer) | 1.0 |
| A black ink was prepared as in Example 1. | |

The following Comparative Samples were prepared by the same method as used in Example 1.

COMPARATIVE EXAMPLE 1

This corresponds to Example 1 of the invention "Ball-point writing pen" shown in Japanese Unexamined Published Patent Application No. 156731/79.

| Components | % by weight |
|---|---|
| Rubber component:<br>IR 2200 | 22.5 |
| Volatile solvent:<br>n-Heptane (b.p. 98.4° C.) | 23.5 |
| Pigment<br>Carbon Black MA-100 | 20.0 |
| Nonvolatile solvent: | 30.0 |

-continued

| Components | % by weight |
|---|---|
| Therm S 900 (product of Nippon Steel Chemical Co., Ltd., b.p. 340° C.) | |
| Lubricants: | |
| Stearic acid | 2.0 |
| Lauric acid | 2.0 |

COMPARATIVE EXAMPLE 2

This corresponds to Example 4 of the invention "Ball-point writing device" shown in Japanese Unexamined Published Patent Application No. 155266/81.

| Components | % by weight |
|---|---|
| Rubber component: | 25.0 |
| IR 2200 | |
| Solvents: | |
| Pegasol 1725 (product of Mobil Sekiyu K.K., b.p. 82–122° C.) | 8.0 |
| Idemitsu IP Solvent 2028 (product of Idemitsu Petrochemical Co., Ltd., b.p. 210–265° C.) | 51.0 |
| Pigments: | |
| Alkali Blue Powder RP-00 | 9.3 |
| 718 Fast Blue Conc. SF | 4.7 |
| Lubricants: | |
| Oleic acid | 0.7 |
| Stearic acid | 0.7 |
| Lauric acid | 0.6 |

COMPARATIVE EXAMPLE 3

This corresponds to Example 4 of the invention "Initially erasable ink composition for use with ball-point writing pens" shown in Japanese Unexamined Published Patent Application No. 170967/82.

| Components | % by weight |
|---|---|
| Rubber component: | 23.5 |
| IR 2200 | |
| Solvents: | |
| Pegasol 1725 | 19.0 |
| DOSB-B (product of Shell Chemicals Co., Ltd., b.p. 219–246° C.) | 34.5 |
| Pigments: | |
| Seika Red 1547 (product of Dainichiseika Color & Chemicals Mfg. Co., Ltd.) | 20.5 |
| Lubricants: | |
| Oleic acid | 0.5 |
| Stearic acid | 1.0 |
| Lauric acid | 1.0 |

WRITING TEST

The inks prepared in Examples 1 to 7 and Comparative Examples 1 to 3 were filled in ball-point pen refills each provided with a stainless steel ball holder and a sintered aventurine writing ball having a diameter of 0.7 mm. Each refill was filled with 0.5 g of ink, charged with nitrogen gas up to 5 atmospheres, and then sealed. Five samples of this ball-point pen were provided for each ink preparation and their writing performance was examined with a writing tester (load: 200 g, angle: 70°, speed: 4 m/min) at various temperatures and humidities and for various periods during which the pens were left uncapped.

The test results are shown in the following Table, wherein the Arabic numerals in the columns I, II, III and IV represent the number of ball-point pens having the quality indicated by the corresponding Roman numeral.

TABLE

| Test Conditions | Example 1 | | | | Example 2 | | | | Example 3 | | | | Example 4 | | | | Example 5 | | | | Example 6 | | | | Example 7 | | | |
|---|---|---|---|---|---|---|---|---|---|---|---|---|---|---|---|---|---|---|---|---|---|---|---|---|---|---|---|---|
| | I | II | III | IV | I | II | III | IV | I | II | III | IV | I | II | III | IV | I | II | III | IV | I | II | III | IV | I | II | III | IV |
| 1 | 5 | | | | 5 | | | | 5 | | | | 5 | | | | 5 | | | | 5 | | | | 5 | | | |
| 2 | 5 | | | | 5 | | | | 5 | | | | 5 | | | | 5 | | | | 5 | | | | 5 | | | |
| 3 | 4 | 1 | | | 5 | | | | 3 | 2 | | | 5 | | | | 5 | | | | 4 | 1 | | | 4 | 1 | | |
| 4 | 5 | | | | 5 | | | | 5 | | | | 5 | | | | 5 | | | | 5 | | | | 5 | | | |
| 5 | 4 | 1 | | | 4 | 1 | | | 4 | 1 | | | 5 | | | | 3 | 2 | | | 4 | 1 | | | 3 | 2 | | |
| 6 | 5 | | | | 5 | | | | 4 | 1 | | | 5 | | | | 4 | 1 | | | 5 | | | | 5 | | | |

| Test Conditions | Comparative Example 1 | | | | Comparative Example 2 | | | | Comparative Example 3 | | | |
|---|---|---|---|---|---|---|---|---|---|---|---|---|
| | I | II | III | IV | I | II | III | IV | I | II | III | IV |
| 1 | 1 | 3 | 1 | | | 1 | 2 | 2 | | 2 | 2 | 1 |
| 2 | 2 | 3 | | | 1 | 1 | 3 | | 1 | 1 | 3 | |
| 3 | | 3 | 1 | 1 | | 1 | 2 | 2 | | 1 | 3 | 1 |
| 4 | 2 | 2 | 1 | | 1 | | 4 | | | 3 | 2 | |
| 5 | | 2 | 2 | 1 | | | 2 | 3 | | | 2 | 3 |
| 6 | | 3 | 2 | | | | 4 | 1 | | 1 | 2 | 2 |

The respective numerals in the column of "Test Conditions" represent the following:
1: 50° C.×98–100% r.h.* for 2 weeks
2: R.T.*×98–100% r.h. for 2 weeks
3: 50° C.×98–100% r.h. for 4 weeks
4: R.T.×98–100% r.h. for 4 weeks
5: 50° C.×98–100% r.h. for 2 months
6: R.T.×98–100% r.h. for 2 months
*R.T.=room temperature, r.h.=relative humidity The Roman numerals I to IV represent the quality of a ball-point pen according to the following rating indices:
I: Ink traces appeared as soon as the writing started (good product).
II: Ink traces appeared within 30 mm from the starting point of writing (good product).
III. Ink traces did not appear within 30 mm, but it appeared within 300 mm from the starting point (poor product).
IV: Ink traces did not appear for a writing distance exceeding 300 mm (poor product).

As the data in the Table show, the ball-point pen ink in accordance with the present invention exhibits good useful writing characteristics.

While the invention has been described in detail and with reference to specific embodiments thereof, it will be apparent to one skilled in the art that various changes and modifications can be made therein without departing from the spirit and scope thereof.

What is claimed is:

1. An erasable ball-point pen ink comprising:
   a rubber component in an amount ranging from about 10% to about 28% of the total weight of the ink;
   a volatile solvent having a boiling point of 60°–170° C. in an amount ranging from about 20% to about 40% of the total weight of the ink;
   a pigment having a particle size of 0.002 micron to 5 microns in an amount ranging from about 12% to about 35% of the total weight of the ink; and
   a nonvolatile solvent having a boiling point of about 300° C. or above which is selected from the group consisting of petroleum lubricating oils, dioctyl phthalate, dioctyl adipate and dibutyl phthalate in an amount ranging from about 17% to about 38% of the total weight of the ink;
   said ink further containing at least one dispersant that is liquid at room temperature and completely soluble in said volatile solvent and which is selected from the group consisting of alkyl phosphate esters, amines and oxyethylene-oxypropylene block copolymers in an amount ranging from about 0.2% to about 6% of the total weight of the ink.

2. An erasable ball-point pen ink as claimed in claim 1, wherein the alkyl phosphate esters are selected from the group consisting of nonyl phosphate, lauryl phosphate, oleyl phosphate, polyoxyethylenenonylphenol phosphate, polyoxyethylenelauryl phosphate, polyoxyethylenecetyl phosphate and polyoxyethyleneoleyl phosphate.

3. An erasable ball-point pen ink as claimed in claim 1, wherein the amines are primary, secondary and tertiary aliphatic or aromatic mono-, di- and triamines.

4. An erasable ball-point pen ink as claimed in claim 3, wherein the amines are selected from the group consisting of dimethylalkylamines, oxyethylenealkylamines, polyoxyethyleneamines, and diamines of various acids of oil and fat.

5. An erasable ball-point pen ink as claimed in claim 1, wherein the oxyethylene-oxypropylene block copolymers have molecular weights not higher than 4,500 and contain 70% by weight or less of oxyethylene based on the weight of oxyethylene-oxypropylene block copolymer.

6. An erasable ball-point pen ink as claimed in claim 1, wherein the rubber component is a synthetic rubber of cis-1,4-polyisoprene series.

7. An erasable ball-point pen ink as claimed in claim 6, wherein the synthetic rubber of cis-1,4-polyisoprene series has a Mooney viscosity of 20 to 26.

8. An erasable ball-point pen ink as claimed in claim 1, wherein the volatile solvent is selected from the group consisting of an aliphatic hydrocarbon, a petroleum solvent, an aromatic hydrocarbon and mixtures of these solvents.

9. An erasable ball-point pen ink as claimed in claim 8, wherein the volatile solvent is a mixture of aliphatic hydrocarbons.

10. An erasable ball-point pen ink as claimed in claim 1, wherein the pigment is selected from the group consisting of carbon black, graphite, Prussian blue, iron oxide, and azo series, an anthraquinone series, a phthalocyanine series, a triphenylmethane series, a quinacridone series and a dioxazine series.

11. An erasable ball-point pen ink as claimed in claim 1, wherein the nonvolatile solvent is dioctyl adipate.

12. An erasable ball-point pen ink as claimed in claim 1, wherein the dispersant is only alkyl phosphate esters.

13. An erasable ball-point pen ink as claimed in claim 1, wherein the dispersant is only amines.

14. An erasable ball-point pen ink as claimed in claim 1, wherein the dispersant is only oxyethylene-oxypropylene block copolymers.

15. An erasable ball-point pen ink as claimed in claim 1, wherein the dispersant is only a combination of oxyethylene-oxypropylene block copolymers and alkyl phosphate esters.

16. An erasable ball-point pen ink as claimed in claim 1, wherein the ink additionally contains finely divided particles of an inorganic compound that is inactive to other ink components and has a particle size of 0.02 micron to 1.5 microns.

17. An erasable ball-point pen ink as claimed in claim 16, wherein the fine particulate inorganic compound is selected from the group consisting of calcium carbonate and silicon oxide.

18. An erasable ball-point pen ink as claimed in claim 1, wherein the ink additionally contains a semi-solid substance and a soft-solid substance having a melting point higher than room temperature and not higher than 130° C.

19. An erasable ball-point pen ink as claimed in claim 18, wherein the semi-solid or soft-solid substance is petroleum waxes, vegetable waxes, animal waxes, lanolins, vaselines and silicone oils.

* * * * *